United States Patent

Saadat

[11] Patent Number: 6,057,689
[45] Date of Patent: May 2, 2000

[54] APPARATUS AND METHOD FOR LEAK DETECTION IN A FLUID-FILLED BALLOON USEFUL TO TREAT BODY TISSUE

[75] Inventor: Vahid Saadat, Redwood Shores, Calif.

[73] Assignee: Gynecare, Inc., Menlo Park, Calif.

[21] Appl. No.: 08/905,367

[22] Filed: Aug. 4, 1997

[51] Int. Cl.⁷ ........................... G01R 31/12; G01N 27/00
[52] U.S. Cl. ...................... 324/557; 324/71.1; 324/556; 73/40; 604/111; 600/16
[58] Field of Search ................. 324/71.1, 71.2, 324/551, 555, 556, 557, 713, 717, 718, 722, 724; 73/40, 45.5, 49.2; 340/605; 600/16, 18; 604/96, 100, 111

[56] References Cited

U.S. PATENT DOCUMENTS

| | | | |
|---|---|---|---|
| 3,252,155 | 5/1966 | Surtees et al. | |
| 4,212,192 | 7/1980 | Taylor | 73/45.5 |
| 4,221,124 | 9/1980 | Jones | 73/40 |
| 4,909,069 | 3/1990 | Albi et al. | 324/557 |
| 5,045,051 | 9/1991 | Midler et al. | 600/16 |
| 5,059,913 | 10/1991 | Nigro et al. | 324/557 |
| 5,196,799 | 3/1993 | Beard et al. | |
| 5,448,177 | 9/1995 | Thompson | 324/557 |
| 5,455,507 | 10/1995 | Horenstein | 324/557 |

FOREIGN PATENT DOCUMENTS

58111749   7/1983   Japan.

*Primary Examiner*—Diep N. Do
*Attorney, Agent, or Firm*—Emil Richard Skula

[57] ABSTRACT

An apparatus for detecting leaks in a fluid-filled device used to treat a patient's tissue includes an catheter having an expandable device defining a fluid reservoir about the distal end of the catheter. An internal electrode is in electrical contact with a conductive fluid within the fluid reservoir. A grounding electrode is outside of the fluid reservoir, in electrical contact with the patient's tissue. Voltage is supplied to the internal electrode and the grounding electrode. Where a leak occurs in the expandable device, conductive fluid will contact the patient's tissue, thus creating an electrical current path between the internal electrode and the grounding electrode. This so-called "leak current" is used to generate a leak alarm signal.

19 Claims, 8 Drawing Sheets

APPARATUS AND METHOD FOR LEAK DETECTION IN A FLUID-FILLED BALLOON USEFUL TO TREAT BODY TISSUE

BACKGROUND OF THE INVENTION

1. Field of the Invention

The invention relates to a device for detecting leaks in a fluid-filled container. More particularly, the present invention relates to an apparatus and method for detecting leaks in an expandable device filled with fluid, such as a fluid-filled balloon, which is used to treat a patient's body tissue during medical procedures.

2. Description of Related Art

Fluid-filled balloons have been used in various medical procedures. For example, surgical balloons are sometimes used in endoscopic surgeries to create working space within a human body. Other medical balloons include thermal treatment balloons which are inflated within a body cavity, such as a cavity defined by a human organ, and filled with a heated fluid to impart thermal energy to the organ.

Application of thermal energy with fluid-filled balloons has been of particular use in treating tissue in body cavities of animals, including humans. For example, balloons filled with heated fluid have been used to effect coagulation and/or cauterization of a uterine endometrium. The distensible bladder is inflated to a predetermined pressure with a fluid so that the distensible bladder is in contact with substantially all of the tissue lining for which treatment is desired. The fluid is heated to a temperature sufficient to coagulate and/or ablate the tissue lining. The temperature and pressure of the fluid is controlled by means connected to the distensible bladder.

A concern in various medical procedures utilizing fluid-filled balloons is the potential for leaks in the balloon. The fluids used to inflate medical balloons may in some cases cause discomfort to the patient if allowed to leak from the balloon directly into the patient's body. Some fluids may even be toxic to the human body. Accordingly, it is often desirable to rapidly and accurately detect leaks in fluid-filled balloons.

Many leaks can be detected prior to use of a balloon through established methods, such as visual inspection of the balloon before the balloon is inserted into the patient. Detecting leaks prior to use of the balloon is not always possible, however, since leaks can form during a procedure, while the balloon is inside the patient and inflated with fluid.

Rapid detection of leaks can allow the surgeon or other user to rapidly deflate and remove a leaking balloon, thereby minimizing the amount of fluid leaking into the patient's body.

Various methods of detecting leaks during a procedure are known. The most common is visual inspection of the balloon. The balloon, however, can not always be easily viewed during various procedures, such as may be the case where the balloon is entirely within the patient's body (such as inside a human uterus). Some leaks, such as small pin-point leaks, cannot be easily seen even where the balloon itself is readily visible.

Another method of detecting leaks during a procedure involves monitoring the internal pressure of the balloon to detect drops in internal pressure, which are indicative of a leak. Some pressure drops, however, may not be of sufficient size to trigger a leak detection alarm, particularly for very slow leaks. Detecting pressure drops may be difficult in procedures during which fluid from inside the balloon is pumped out and continuously replaced with "fresh" fluid from outside the balloon. The constant inflow and outflow of fluid can create pressure variations that may make pressure-sensitive leak detection systems ineffective.

Consequently, there is a need to accurately and efficiently detect leaks in fluid-filled balloons used in medical procedures that allows for leaks to be rapidly detected during the actual procedure. The present invention satisfies these needs.

SUMMARY OF THE INVENTION

Briefly and in general terms, the present invention provides a method and apparatus for detecting fluid leaks in a fluid-filled bladder used to treat a patient's tissue, including surgical procedures, thermal treatment, and related procedures using fluid-filled devices.

In one embodiment, the apparatus comprises an expandable device defining a fluid reservoir therein for holding a conductive fluid, a supply conduit in fluid communication with the fluid reservoir for delivering the conductive fluid into the fluid reservoir, a first internal electrode in electrical contact with the fluid reservoir, a second grounding electrode positioned outside the expandable device, a power supply for generating a voltage between the first electrode and the grounding electrode, and a detector for detecting variations in the electrical current passing between the first electrode and the grounding electrode. The detector generates a leak signal in response to a change in the electrical current passing between the first electrode and the grounding electrode, and a leak alarm is activated to warn a user of a leak in the fluid reservoir.

The alarm may be a visual or audio alarm, or a combination of video and audio elements. The alarm may indicate the magnitude of the leak.

The internal electrode may comprise a conductive inner coating of the bladder. Similarly, the grounding electrode may comprise a conductive outer coating of the bladder. The grounding electrode may alternatively be positioned on the outside of the device, or may be a separate element placed against the outside surface of the patient's body.

In an embodiment of the invention, the bladder is generally non-conductive, and little or no current passes from the internal electrode to the grounding electrode in the absence of a leak. In such an embodiment, the presence of any current between the internal electrode and the grounding electrode may be used to indicate a leak.

In a further embodiment of the invention, the bladder is conductive, and current may pass from the internal electrode to the grounding electrode even without the presence of a fluid leak in the balloon. Where a leak develops, the leaking fluid will alter the current flow between the internal and grounding electrode.

The alarm may be activated by any current flow between the internal electrode and the grounding electrode. Alternately, the alarm may be activated when there is a substantial change in the current flow between the internal electrode and the grounding electrode.

The power supply may provide and alternating or direct current source. The power supply may provide radio frequency power between the internal and grounding electrodes.

Other features and advantages of the present invention will become more apparent from the following detailed description of the invention when taken in conjunction with the accompanying drawings.

DETAILED DESCRIPTION OF THE PREFERRED EMBODIMENTS

Figure 1:
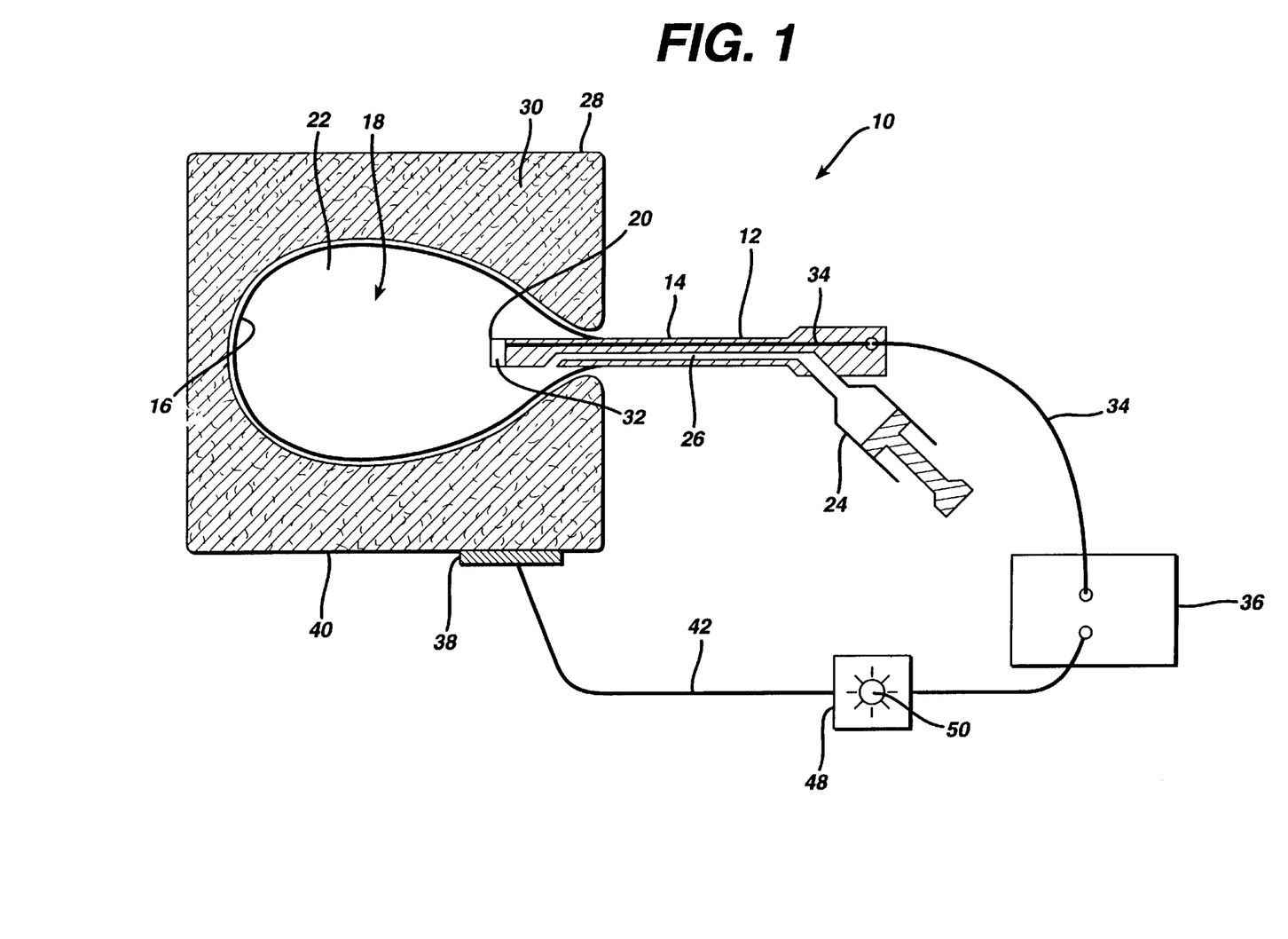
FIG. 1 is a side view, in partial cross section, of an apparatus according to one embodiment of the present invention, including a treatment catheter having a bladder.
Figure 1A:
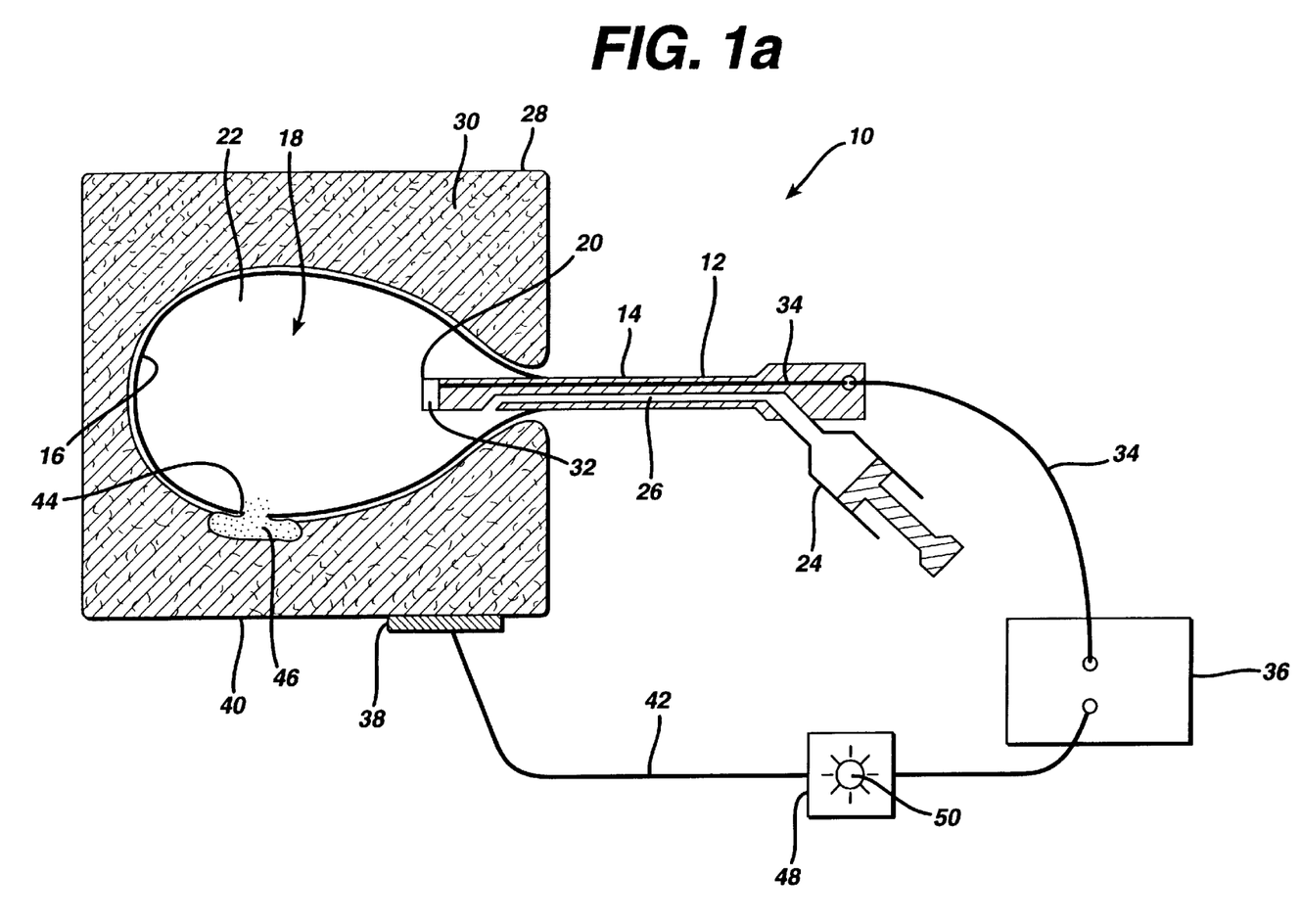
FIG. 1a is a side view, in partial cross-section, of an apapratus according to FIG. 1, wherein a leak is present in the bladder.
Figure 2:
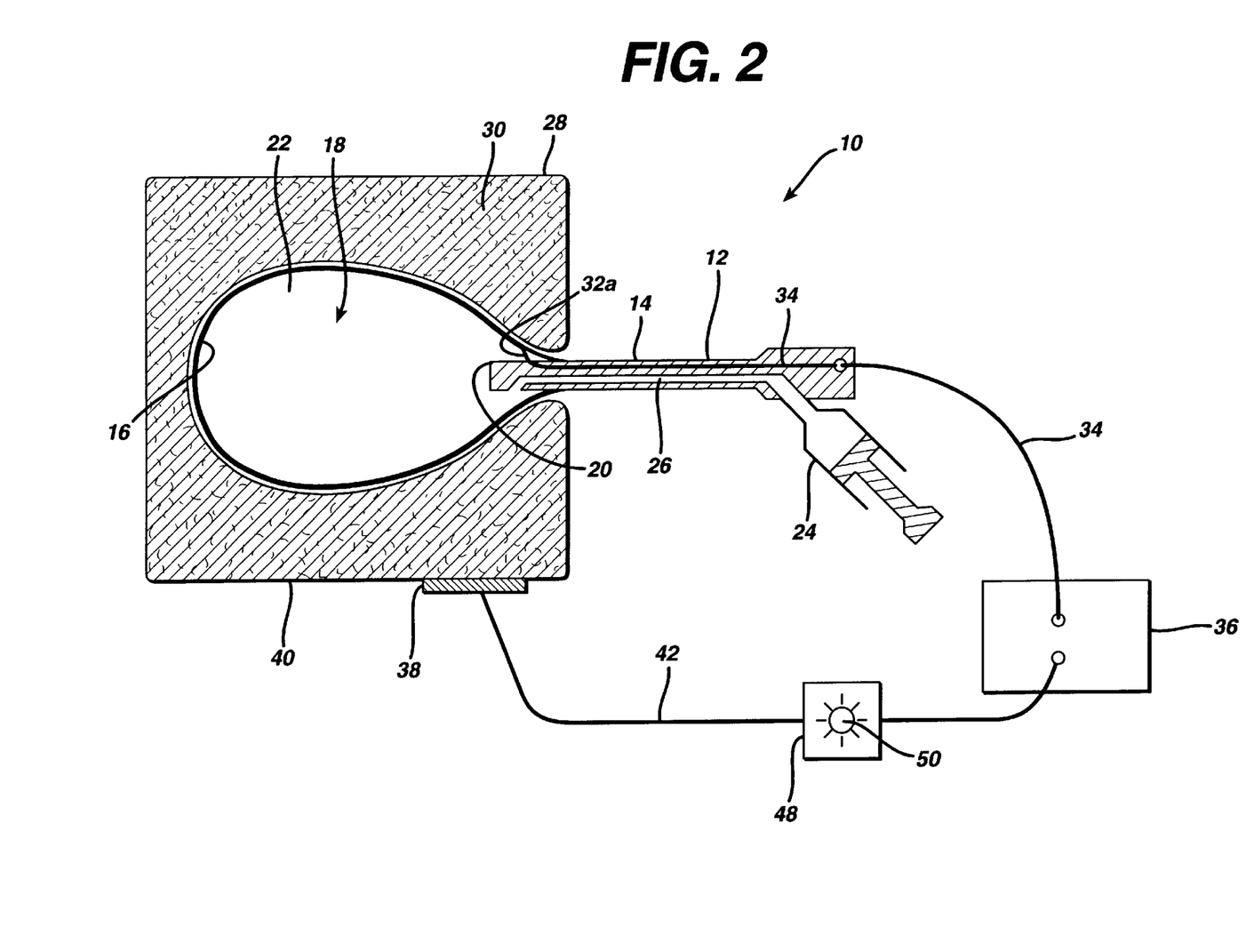
FIG. 2 is a side view, in partial section, of an apparatus according to another embodiment of the invention.
Figure 3:
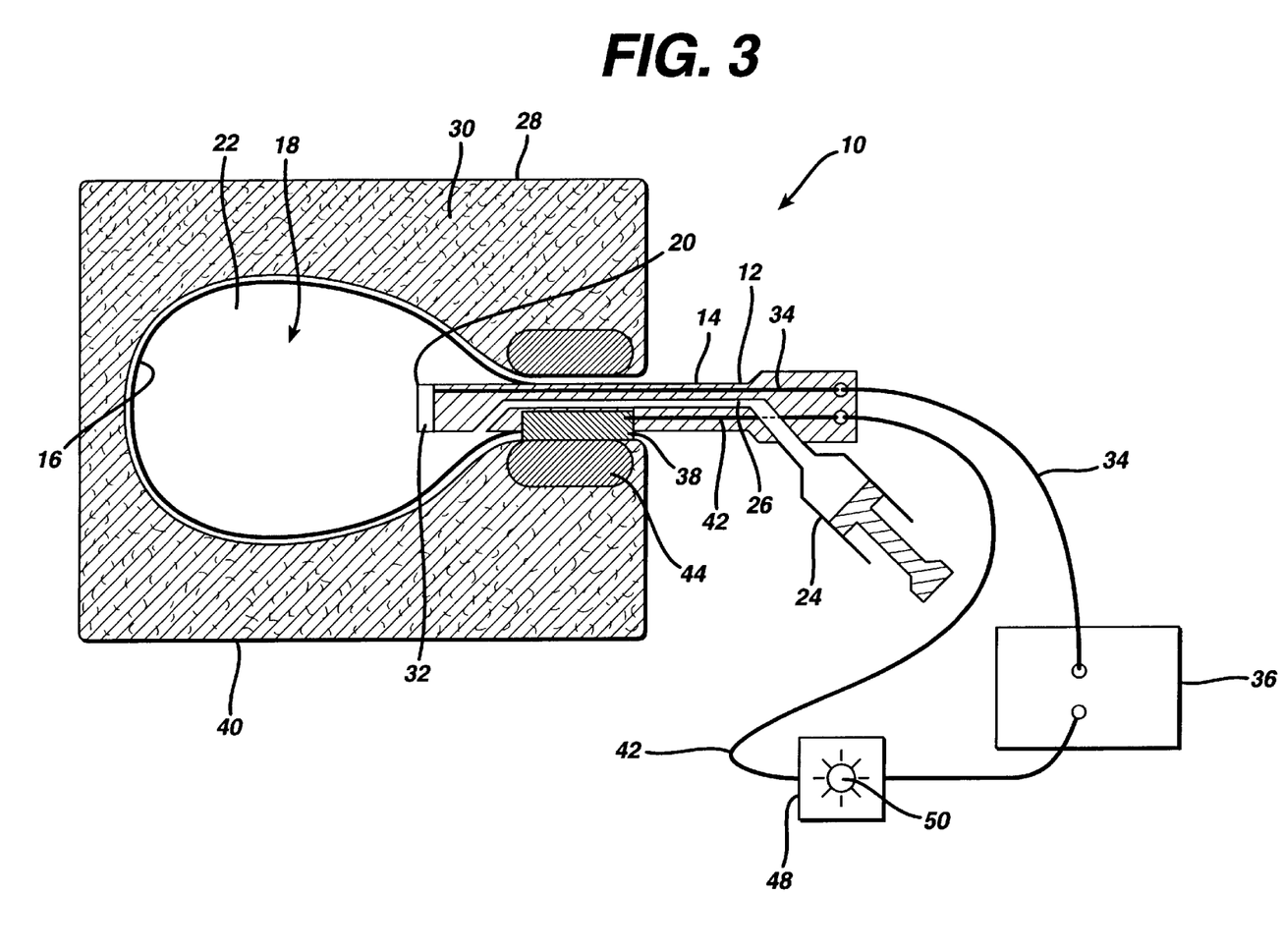
FIG. 3 is a side view, in partial cross section, of an apparatus according to a further embodiment of the invention.

The present invention is depicted in FIGS. 1–3 for use in body cavities, including use in ablating the endometrial lining of a patient's uterus. However, the present invention is not limited to use in the uterus, and may be applied to various treatments involving fluid-filled devices where leak detection is desired.

Referring now to FIG. 1, in one preferred embodiment the apparatus 10 of the invention comprises a catheter 12 including a generally elongated shaft 14 having a distensible bladder 16 or similar expandable device defining a fluid reservoir 18 at the shaft distal end 20.

The bladder 16 preferably comprises a generally nonconductive material to prevent electrical signals from passing from the inside to the outside of the bladder 16, absent a leak therein. The bladder 16 may be formed of inelastic or elastic materials, depending on the particular application.

In the embodiment shown, the fluid reservoir 18 is filled with fluid 22 provided by a syringe 24 or other fluid source. The syringe 24 is in fluid contact with the fluid reservoir via a fluid supply conduit 26. The fluid is preferably a conductive fluid, such as a saline solution.

In the embodiment shown in FIG. 1, the bladder 16 is positioned within a patient's body 28 such that the bladder 16 is surrounded by the patient's body tissue 30. Due to the non-conductive nature of the bladder 16, electrical current cannot easily pass from within the bladder 16 to the surrounding patient's tissue 30.

The distal end 20 of the catheter shaft 14 includes an internal electrode 32, positioned inside the bladder 16. The internal electrode 32 is in electrical contact with the fluid 22. The internal electrode 32 is connected to an internal electrical lead 34 that electrically connects the internal electrode 32 with a voltage source 36.

The embodiment of FIG. 1 shows the internal electrode 32 at the distal end 20 of the catheter shaft 14. The internal electrode 32, however, may placed at various locations on the apparatus, so long as it is in electrical contact with the conductive fluid. For example, the internal electrode may be positioned within the fluid supply conduit 26, or within the syringe 24 or similar fluid source. The internal electrode 32 may be positioned on the internal surface of the bladder, or may even comprise a conductive inner lining 32a of the bladder, as shown in FIG. 2.

The apparatus further includes a grounding electrode 38 in electrical contact with the patient's body tissue 30, which in the embodiment shown involves positioning the grounding electrode 38 against the exterior 40 of the patient's body 28. The grounding electrode 38 is in electrical contact with the voltage supply 36 via a grounding electrical lead 42.

Numerous alternate configurations of the grounding electrode 38 are possible. The grounding electrode may be part of another device that is used during the particular procedure. For example, in a heated balloon apparatus used to treat tissue within a human uterus, the grounding electrode 38 may be part of a vaginal speculum used during the procedure. Other locations for the grounding electrode are within the scope of the invention, including positioning the grounding electrode on the outside of the portion of the apparatus that is within the patient's body. FIG. 3 depicts various alternate positions for grounding electrodes, including a grounding electrode 38a positioned on the outside of the catheter shaft 14, and a grounding electrode 38b positioned on the outside of the bladder 16.

Multiple grounding electrodes may be used, depending on the particular application. The grounding electrode 38 may be positioned on the apparatus such that, during a particular procedure, the grounding electrode 38 will contact a particular type and/or area of patient tissue that may have particularly desirable characteristics, such as visibility and/or conductivity. For example, the device depicted in FIG. 3 has a grounding electrode 38b positioned on the catheter shaft so that, when the bladder 16 is inflated within the patient's body 28, the grounding electrode 38b contacts selected tissue 44 having desirable characteristics, such as visibility, conductivity, or ease of access. For example, in an intrauterine device used to thermally treat uterine tissue, the grounding electrode may be positioned on the catheter shaft such that, when the device is positioned with the bladder in a human uterus, the catheter shaft extends out of the patient through the vagina, and the grounding electrode will contact particular vaginal tissue during the procedure.

Referring again to FIG. 1, the voltage supply 36 produces a voltage potential between the internal electrode 32 and the grounding electrode 38. If the bladder 16 is nonconductive under normal circumstances, i.e., where there is no leak in the bladder, there will be no current flow between the internal electrode 32 and the grounding electrode 38. The bladder 16 will thus act as an insulator between the internal electrode 32 and conductive fluid 22 within the bladder 16 and the patient's tissue 30 and the grounding electrode 38 outside the bladder 16.

If a leak 46 occurs in the bladder 16, as shown in FIG. 1a, the leaking fluid 48 will create an electrical connection across the insulating bladder 16. Thus, current will flow from the internal electrode 30, to the conductive fluid 22 in the fluid reservoir 18, through the bladder 16 via the leaking fluid 48, into the patient's tissue 30, and into the grounding electrode 38. This so-called "leak current" indicates the presence of the leak 46 and is used to activate a leak alarm 50.

It should be noted that the bladder 16 does not have to be non-conductive. If the bladder 16 is conductive, there will be a current flow between the internal electrode 30 and the grounding electrode 38, even without any leak in the bladder 16. If a leak 46 develops, the leaking fluid 48 will cause a change in the conductivity between the conductive fluid reservoir 18 and the patient's tissue 30, thereby changing the current between the internal electrode 30 and the grounding electrode 38. By monitoring the current during the procedure, a change in current can be detected and used to indicate a leak 46 in the bladder 16.

Various frequencies for the leak voltage supply 36 may be used. For a voltage supply producing an alternating current, the voltage signal will preferably have sufficient frequency to impart a relatively low impedance (i.e., 50–1000 ohms) as it passes through the patient's body 28. Among the useful frequencies are the radio frequency regime, which typically has the appropriate penetration characteristics within the human body. The total magnitude of the leak voltage signal should be quite small, so that the leak current does not have to exceed a few microamperes. Only a very small leak current will thus pass through the patient's tissue 30, thereby avoiding tissue damage that might result from high current levels passing through the patient's tissue 30.

The leak current may be detected in various ways. For example, the voltage supply may be monitored for any voltage drops caused by a leak current. The leak current may itself provide electrical power to an alarm 50. In the embodiment shown in FIG. 1, the leaking current provides power to activate an alarm 50, in the form of a warning light 52.

The alarm 50 may be a simple binary signal, indicating the presence of a leak but no further information, such as leak intensity. Such an embodiment may include, for example, a warning light 52 and/or an audible buzzer that is activated when a leak current is detected.

Figure 4:
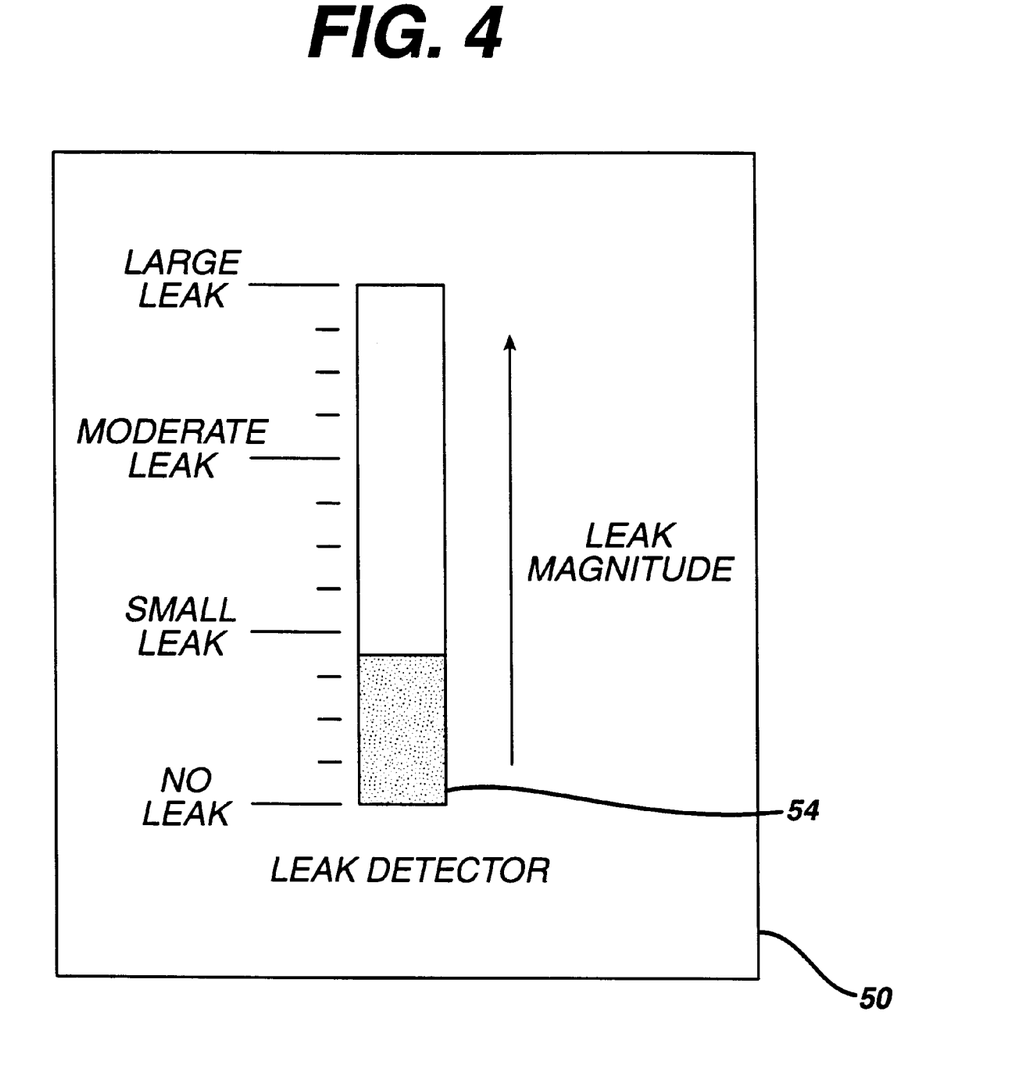
FIG. 4 shows an alarm according to one embodiment of the invention.

In another embodiment, however, the alarm may indicate the size of the leak. For example, the alarm may comprise a warning light that has varying brightness, so that greater brightness indicates a larger leak. The alarm may comprise one or more audible tones that vary in intensity and/or frequency from small to large leaks. The alarm 50 may comprise a visual bar-graph display 54, such as an LCD display, indicating the magnitude of the leak, as shown in FIG. 4. Various alarm types may be combined, such as an LCD bar-graph with a flashing warning light and an audible tone.

The system may employ various techniques to prevent false alarms. Due to variances in patient population and in device characteristics, including the electrical conductivity of the bladder 16, the mere presence of a current between the internal electrode 30 and the grounding electrode 38 may not always indicate an actual leak. For example, in certain applications, the use of conductive bladder materials may be desirable. To prevent false alarms in such circumstances, it may be preferable to monitor changes in the current and/or voltage, as opposed to merely detecting the existence of a current, as a leak indicator. Such a method may involve using a level shift in current or voltage to detect a leak.

Figure 5:
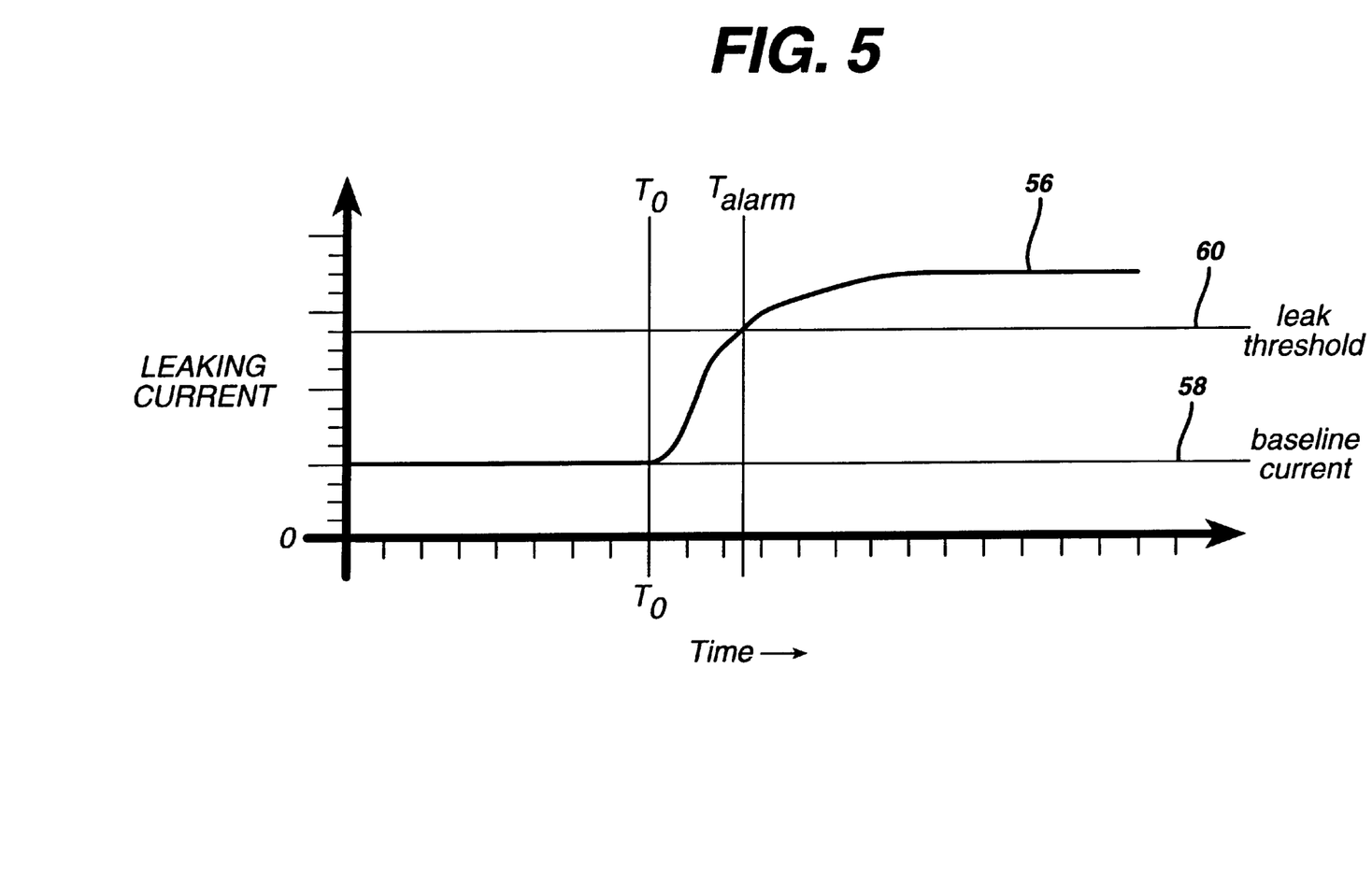
FIG. 5 is a chart showing variations in leak current over time.

In the example depicted in FIG. 5, a monitored current 56 between the internal electrode and grounding electrode exists. The monitored current 56 is about the same as an anticipated baseline current 58, which is the current expected in the particular system in the absence of a leak. At $T_0$, a leak occurs, causing a substantial increase in the current 56. The change in current is detected by the system, which may use a variety of methods to determine if a leak is present. For example, the system may have a processor 61, depicted in FIG. 6, that monitors abrupt changes in current and uses this information to determine the presence or absence of a leak. Determining the abruptness of a current change may be performed by traditional methods, such as by applying the first derivative of the current. The system may simply compare the current 56 to a threshold value, such as the leak threshold 60 shown in FIG. 5. At $T_{alarm}$, the current 56 exceeds the leak threshold 60, and the alarm is activated.

Figure 6:
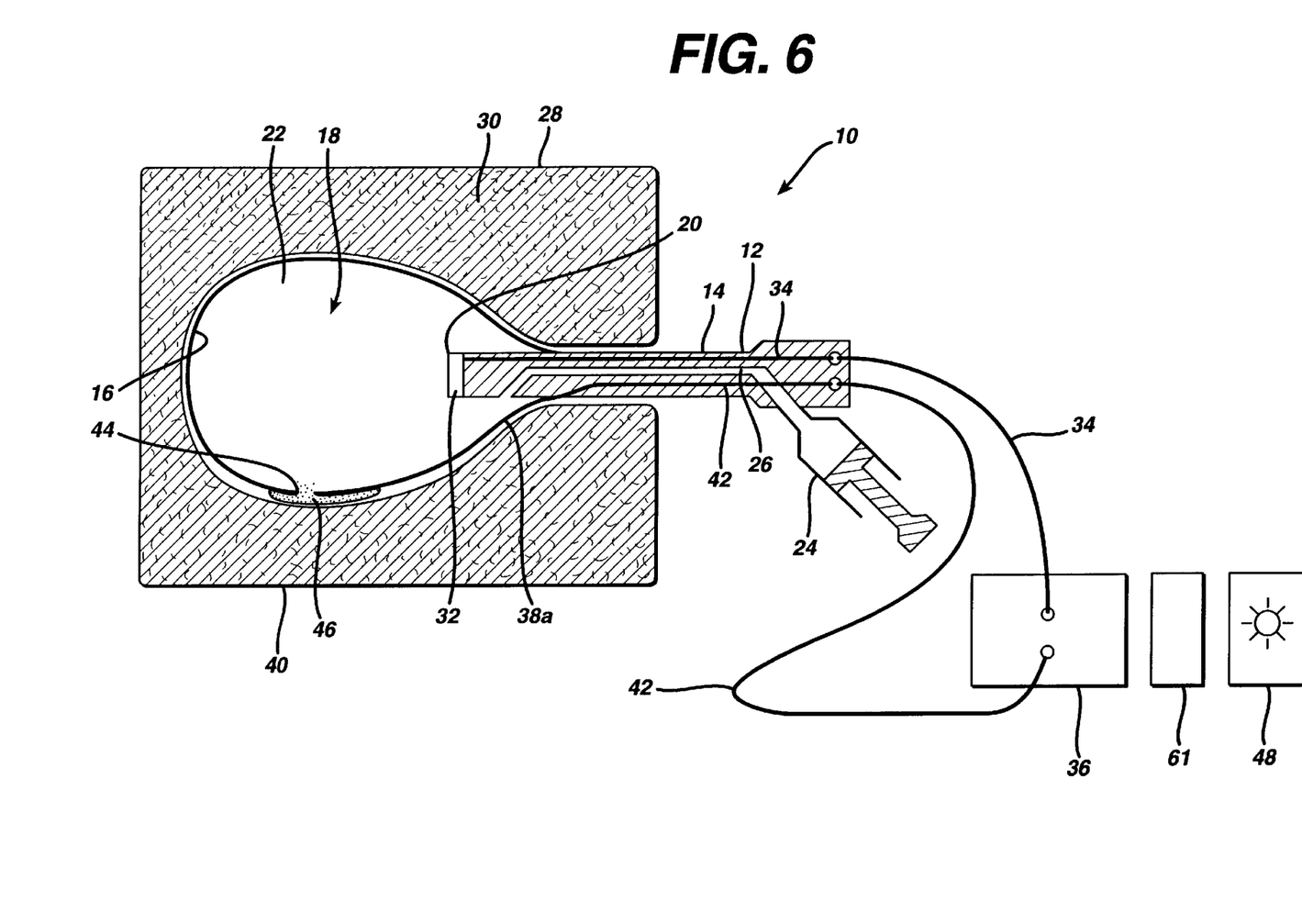
FIG. 6 is a side view, in partial cross section, of an apparatus according to another embodiment of the invention.

In a further embodiment of the invention, the grounding electrode may comprise a conductive outer coating 38a on the bladder 16, as shown in FIG. 6. In this embodiment, the leaking fluid 46 will come into direct contact with the grounding electrode conductive outer coating 38a, so that the leaking current passes directly from the leaking fluid 46 to the grounding electrode 38a. Thus, the patient's tissue 30 does not have to carry significant amounts of leak current. Moreover, the size of the leak current in such an embodiment may provide a more accurate estimate of the magnitude of the fluid leak.

FIG. 6 also depicts a processor 61 which receives a signal, such as an indicator of a voltage drop from the power source 36 or a measure of the leak current, and processes this information to detect a fluid leak. The processor 61 may analyze the strength and/or variation in the current or voltage drop to determine the presence or absence of a fluid leak, as was discussed previously with respect to FIG. 4.

Figure 7:
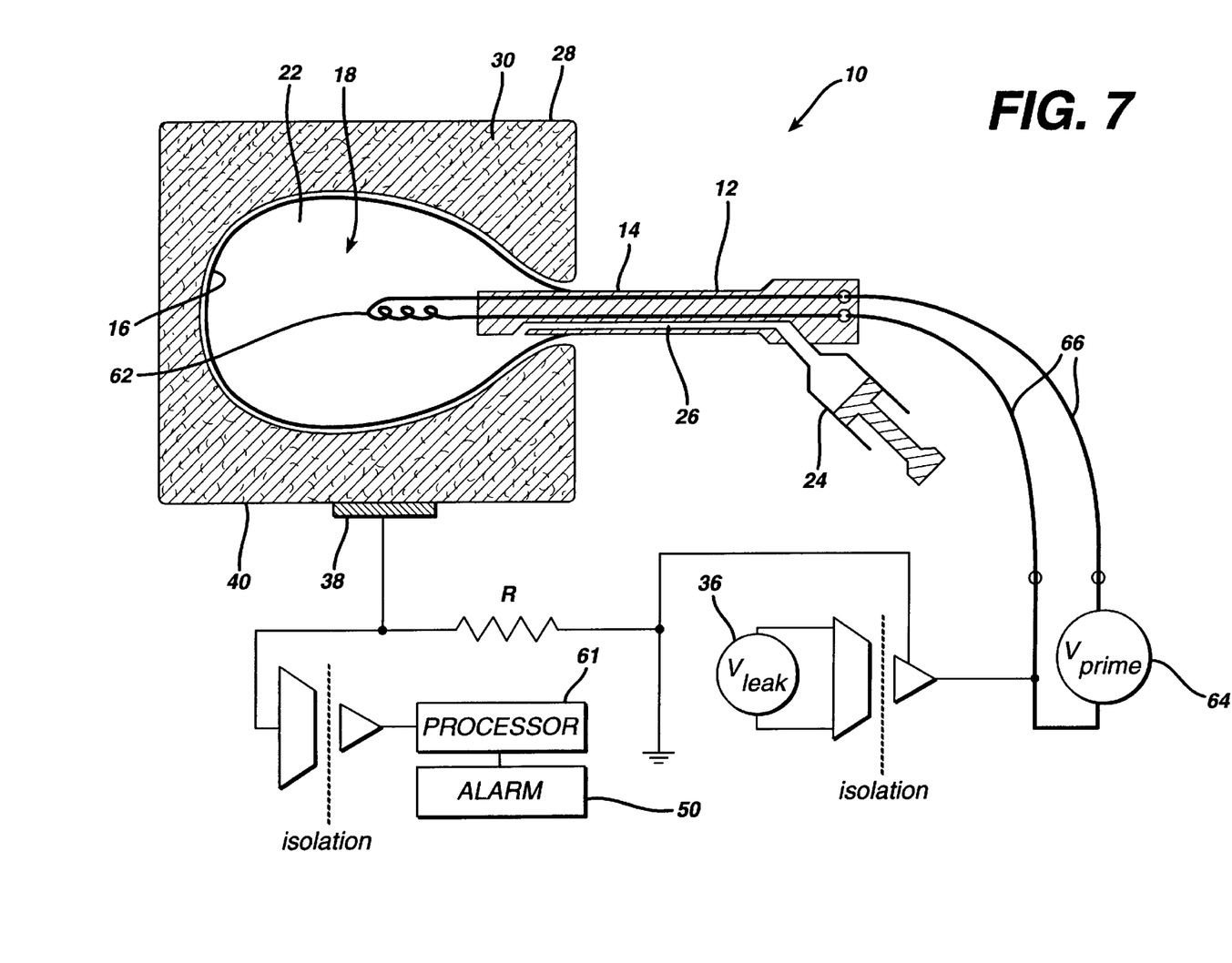
FIG. 7 is a side view, in partial cross section, of an apparatus according to a further embodiment of the invention.

FIG. 7 depicts an alternate embodiment of the invention, wherein the catheter 12 has a primary electrical device 62 within the bladder 16, such as an electrical coil, a main purpose of which may be unrelated to leak detection. A primary voltage source 64 energizes the primary electrical device 62 via lead wires 66 to provide heat or other forms of energy.

A grounding electrode 38 is, in the embodiment depicted, placed adjacent the outside of the patient's body 28. The leak voltage source 36 provides a voltage potential between the grounding electrode 38 and the primary voltage source 64/primary electrical device 62. Under normal conditions, little if any current will flow from the primary electrical device 62 and the grounding electrode 38. If a leak develops in the bladder 16, however, a leak current will pass from the primary electrical device 62 to the grounding electrode 38. Where other electrical devices are present, as in the embodiment of FIG. 7, the leak supply voltage 36 should be selected to provide a signal which does not interfere with operations of the other electrical devices. By using high-frequency signals for the leak supply voltage 36, the total magnitude of the leak current imposed on the primary voltage supply 64 will be on the order of only a few microamperes.

To enhance system safety and effectiveness, the leak voltage supply 36 may be electrically isolated from the primary voltage supply 64 and from the grounding pad 38, as shown in FIG. 7A. The alarm 50 and processor 61 may also be electrically isolated from the rest of the apparatus.

Although preferred and alternative embodiments of the invention have been described and illustrated, the invention is susceptible to modifications and adaptations within the ability of those skilled in the art and without the exercise of inventive faculty. Thus, it should be understood that various changes in form, detail, and usage of the present invention may be made without departing from the spirit and scope of the invention. Accordingly, it is not intended that the invention be limited, except as by the appended claims.

What is claimed is:

1. An apparatus for detecting fluid leaks in a liquid-filled expandable device used to treat body tissue, the apparatus comprising:

an expandable device defining a liquid reservoir therein for holding a conductive liquid;

a supply conduit in fluid communication with the liquid reservoir for delivering the conductive liquid into the liquid reservoir;

a first, internal electrode lead in electrical contact with the liquid reservoir;

a second, grounding electrode lead positioned outside the expandable device;

a power supply for generating a voltage between the first electrode and the grounding electrode; and a detector for detecting variations in the electrical current passing between the first internal electrode and the second grounding electrode.

2. The apparatus of claim 1, wherein said detector generates a leak signal in response to a change in the electrical current passing between the first electrode and the grounding electrode, and the apparatus further comprises:

a leak alarm that receives the leak signal and activates an alarm indicator to warn a user of a leak in the liquid reservoir.

3. The apparatus of claim 2, wherein the alarm indicator includes a visual alarm.

4. The apparatus of claim 2, wherein the alarm indicator includes an audio alarm.

5. The apparatus of claim 2, wherein the leak signal is proportional to the electrical current across the first electrode and grounding electrode, and the alarm indicator indicates the magnitude of the leak.

6. The apparatus of claim 1, wherein the grounding electrode is positioned on an outside surface of the expandable device.

7. The apparatus of claim 6, wherein the grounding electrode comprises a conductive coating on the outside surface of the expandable device.

8. The apparatus of claim 1, wherein the internal electrode is positioned on an inside surface of the expandable device.

9. The apparatus of claim 8, wherein the internal electrode comprises a conductive coating on the inside surface of the expandable device.

10. The apparatus of claim 1, wherein the power supply generates a radio-frequency voltage between the first electrode and the grounding electrode.

11. A method of detecting leaks in a liquid-filled bladder during a medical procedure in which the liquid-filled bladder is used to treat a patient, the method comprising the steps of:

(a) providing a bladder, said bladder being generally capable of holding liquid;

(b) filling the bladder with a generally conductive liquid;

(c) placing the bladder in contact with a patient's body tissue;

(d) providing a first internal electrode positioned in electrical contact with the conductive liquid in the bladder;

(e) providing a second, grounding electrode, said grounding electrode positioned outside of the bladder;

(f) providing a voltage potential between the internal electrode and the grounding electrode; and (g) detecting variations in the electrical current passing between the first, internal electrode and the second, grounding electrode.

12. The method of claim 11, comprising the further step of:

(h) placing the grounding electrode in electrical contact with the patient's body tissue.

13. The method of claim 11, wherein step (c) comprises the step of inserting the bladder into a body cavity of the patient.

14. The method of claim 13, wherein the body cavity is a human uterus.

15. The method of claim 11, comprising the further step of:

(i) activating an alarm signal in response to the variations in the electrical current between the internal electrode and the grounding electrode.

16. The method of claim 15, wherein step (i) includes the step of comparing the electrical current between the internal electrode and the grounding electrode to a selected threshold value, and activating the alarm signal in response to the electrical current exceeding said selected threshold value.

17. The method of claim 15, wherein the alarm signal is indicative of the magnitude of the variations in the electrical current between the internal electrode and the grounding electrode.

18. The method of claim 11, wherein step (e) comprises the step of providing a conductive coating on the outside of the bladder, said conductive coating functioning as the grounding electrode.

19. The method of claim 11, wherein step (d) comprises the step of providing a conductive inner coating on the inside of the bladder, said conductive inner coating functioning as the internal electrode.

* * * * *